(12) United States Patent
Matus et al.

(10) Patent No.: US 11,878,720 B2
(45) Date of Patent: Jan. 23, 2024

(54) METHOD AND SYSTEM FOR RISK MODELING IN AUTONOMOUS VEHICLES

(71) Applicant: Zendrive, Inc., San Francisco, CA (US)

(72) Inventors: Jonathan Matus, San Francisco, CA (US); Pankaj Risbood, San Francisco, CA (US)

(73) Assignee: Zendrive, Inc., San Francisco, CA (US)

( * ) Notice: Subject to any disclaimer, the term of this patent is extended or adjusted under 35 U.S.C. 154(b) by 562 days.

(21) Appl. No.: 16/861,723

(22) Filed: Apr. 29, 2020

(65) Prior Publication Data

US 2020/0257300 A1 Aug. 13, 2020

Related U.S. Application Data

(63) Continuation of application No. 16/000,675, filed on Jun. 5, 2018, now Pat. No. 10,678,250, which is a (Continued)

(51) Int. Cl.
*B60W 60/00* (2020.01)
*G08G 1/01* (2006.01)
(Continued)

(52) U.S. Cl.
CPC ...... *B60W 60/00188* (2020.02); *B60W 30/00* (2013.01); *B60W 40/09* (2013.01);
(Continued)

(58) Field of Classification Search
CPC ...... G05D 1/0214; G05D 1/0088; G05D 1/00; G05D 2201/0213; B60W 30/00;
(Continued)

(56) References Cited

U.S. PATENT DOCUMENTS 4,100,795 A 7/1978 Panetti
5,673,039 A 9/1997 Pietzsch et al.
(Continued)

FOREIGN PATENT DOCUMENTS

CN 108269406 A 7/2018
CN 108431839 A 8/2018
(Continued)

OTHER PUBLICATIONS

Das Tathagata; et al."PRISM: Platform for Remote Sensing using Smartphones," In. Proc. Mobisys '10, Jun. 15-18, 2010, San Francisco, USA, pp. 63-76.
(Continued)

*Primary Examiner* — Behrang Badii
(74) *Attorney, Agent, or Firm* — Jeffrey Schox; Caitlin Ploch

(57) ABSTRACT

A method for adaptive risk modeling for an autonomous vehicle, the method comprising: retrieving parameters of an identified driving mission of the autonomous vehicle; in response to the parameters of the identified driving mission, generating values of: a comparative autonomous parameter, a mix model parameter, a surrounding risk parameter, a geographic operation parameter, and a security risk parameter upon evaluating situational inputs associated with the identified driving mission with a comparative autonomous model, a mix model, a sensor-surrounding model, a geography-dependent model, and a security risk model generated using sensor and supplementary data extraction systems associated with the autonomous vehicle; upon generating values, generating a risk analysis with a rule-based algorithm; and contemporaneously with execution of the identified driving mission, implementing a response action associated with control of the autonomous vehicle, based upon the risk analysis.

13 Claims, 5 Drawing Sheets

Related U.S. Application Data continuation of application No. 15/835,284, filed on Dec. 7, 2017, now Pat. No. 10,012,993.

(60) Provisional application No. 62/431,949, filed on Dec. 9, 2016.

(51) Int. Cl.

| | | |
|---|---|---|
| *G08G 1/0967* | (2006.01) | |
| *B60W 40/09* | (2012.01) | |
| *B60W 30/00* | (2006.01) | |
| *B60W 50/00* | (2006.01) | |
| *B64D 11/06* | (2006.01) | |
| *B64C 39/02* | (2023.01) | |
| *G08G 5/00* | (2006.01) | |
| *G06Q 40/08* | (2012.01) | |
| *G05D 1/00* | (2006.01) | |
| *G06V 20/56* | (2022.01) | |
| *G06V 40/20* | (2022.01) | |
| *G06F 18/00* | (2023.01) | |
| *G06F 18/23* | (2023.01) | |
| *B60W 50/08* | (2020.01) | |

(52) U.S. Cl.
CPC .... *B60W 50/0098* (2013.01); *B60W 60/0053* (2020.02); *B60W 60/0059* (2020.02); *B64D 11/0624* (2014.12); *G08G 1/0112* (2013.01); *G08G 1/096725* (2013.01); *B60W 50/082* (2013.01); *B60W 2050/0075* (2013.01); *B60W 2420/403* (2013.01); *B60W 2420/52* (2013.01); *B60W 2554/406* (2020.02); *B60W 2554/4026* (2020.02); *B60W 2554/4029* (2020.02); *B60W 2554/4046* (2020.02); *B60W 2555/20* (2020.02); *B60W 2556/10* (2020.02); *B60W 2556/50* (2020.02); *B64C 39/02* (2013.01); *B64C 39/024* (2013.01); *G05D 1/00* (2013.01); *G05D 2201/0213* (2013.01); *G06F 18/00* (2023.01); *G06F 18/23* (2023.01); *G06Q 40/08* (2013.01); *G06V 20/56* (2022.01); *G06V 40/20* (2022.01); *G08G 5/00* (2013.01); *G08G 5/003* (2013.01)

(58) Field of Classification Search
CPC ............. B60W 40/09; B60W 50/0098; B60W 2050/0075; B60W 2556/10; B60W 2556/50; B60W 60/00188; B60W 60/0053; B60W 60/0059; B60W 50/082; B60W 2420/403; B60W 2420/52; B60W 2554/4026; B60W 2554/4029; B60W 2554/4046; B60W 2554/406; B60W 2555/20; B64D 11/0624; G08G 1/0112; G08G 1/096725; G08G 5/00; G08G 5/003; B64C 39/02; B64C 39/024; G06K 9/00; G06K 9/62; G06K 9/6218; G06Q 40/08; G06V 20/56; G06V 40/20; G06F 18/00; G06F 18/23

See application file for complete search history.

(56) References Cited

U.S. PATENT DOCUMENTS

| | | | |
|---|---|---|---|
| 5,864,305 | A | 1/1999 | Rosenquist |
| 6,049,778 | A | 4/2000 | Walker et al. |
| 6,055,477 | A | 4/2000 | McBurney et al. |
| 6,064,318 | A | 5/2000 | Kirchner et al. |
| 6,178,374 | B1 | 1/2001 | Moehlenkamp et al. |
| 6,240,364 | B1 | 5/2001 | Kerner et al. |
| 6,826,477 | B2 | 11/2004 | Ladetto et al. |
| 6,941,222 | B2 | 9/2005 | Yano et al. |
| 7,065,449 | B2 | 6/2006 | Brewster et al. |
| 7,532,196 | B2 | 5/2009 | Hinckley |
| 7,668,931 | B2 | 2/2010 | Parupudi et al. |
| 7,801,675 | B2 | 9/2010 | Currie et al. |
| 7,881,868 | B2 | 2/2011 | Greene et al. |
| 8,054,168 | B2 | 11/2011 | McCormick et al. |
| 8,264,375 | B2 | 9/2012 | Devries |
| 8,290,480 | B2 | 10/2012 | Abramson et al. |
| 8,326,257 | B2 | 12/2012 | Shiu et al. |
| 8,352,189 | B2 | 1/2013 | Scott et al. |
| 8,369,876 | B2 | 2/2013 | Bachmann et al. |
| 8,395,542 | B2 | 3/2013 | Scherzinger et al. |
| 8,489,330 | B2 | 7/2013 | Ellanti et al. |
| 8,498,610 | B2 | 7/2013 | Staehlin |
| 8,504,035 | B2 | 8/2013 | Shin et al. |
| 8,521,193 | B2 | 8/2013 | Paek et al. |
| 8,577,703 | B2 | 11/2013 | McClellan et al. |
| 8,634,822 | B2 | 1/2014 | Silver et al. |
| 8,731,530 | B1 | 5/2014 | Breed et al. |
| 8,731,974 | B2 | 5/2014 | Pandhi et al. |
| 8,738,523 | B1 | 5/2014 | Sanchez et al. |
| 8,754,766 | B2 | 6/2014 | Oesterling et al. |
| 8,912,103 | B2 | 12/2014 | Heo et al. |
| 8,971,927 | B2 | 3/2015 | Zhou et al. |
| 8,972,103 | B2 | 3/2015 | Elwart et al. |
| 8,989,914 | B1 | 3/2015 | Nemat-Nasser et al. |
| 8,996,234 | B1 | 3/2015 | Tamari et al. |
| 9,064,412 | B2 | 6/2015 | Baur |
| 9,121,940 | B2 | 9/2015 | Psiaki et al. |
| 9,141,974 | B2 | 9/2015 | Jones et al. |
| 9,185,526 | B2 | 11/2015 | Guba et al. |
| 9,188,451 | B2 | 11/2015 | Magnusson et al. |
| 9,221,428 | B2 | 12/2015 | Kote et al. |
| 9,222,798 | B2 | 12/2015 | Curtis et al. |
| 9,224,293 | B2 | 12/2015 | Taylor |
| 9,250,090 | B2 | 2/2016 | Hille et al. |
| 9,311,211 | B2 | 4/2016 | Chatterjee et al. |
| 9,311,271 | B2 | 4/2016 | Wright |
| 9,360,323 | B2 | 6/2016 | Grokop |
| 9,368,027 | B2 | 6/2016 | Jang et al. |
| 9,390,625 | B2 | 7/2016 | Green et al. |
| 9,414,221 | B1 | 8/2016 | Simon et al. |
| 9,423,318 | B2 | 8/2016 | Liu et al. |
| 9,449,495 | B1 | 9/2016 | Call et al. |
| 9,457,754 | B1 | 10/2016 | Christensen et al. |
| 9,467,515 | B1 | 10/2016 | Penilla et al. |
| 9,495,601 | B2 | 11/2016 | Hansen |
| 9,536,428 | B1 | 1/2017 | Wasserman |
| 9,558,520 | B2 | 1/2017 | Peak et al. |
| 9,564,047 | B2 | 2/2017 | Wu |
| 9,566,981 | B2 | 2/2017 | Rebhan et al. |
| 9,587,952 | B1 | 3/2017 | Slusar |
| 9,628,975 | B1 | 4/2017 | Watkins et al. |
| 9,632,507 | B1 | 4/2017 | Korn |
| 9,633,487 | B2 | 4/2017 | Wright |
| 9,645,970 | B2 | 5/2017 | Boesch et al. |
| 9,650,007 | B1 | 5/2017 | Snyder et al. |
| 9,674,370 | B2 | 6/2017 | Kim et al. |
| 9,689,698 | B2 | 6/2017 | Wesselius et al. |
| 9,716,978 | B2 | 7/2017 | Sankaran |
| 9,731,713 | B2 | 8/2017 | Horii |
| 9,733,089 | B2 | 8/2017 | Choudhury et al. |
| 9,773,281 | B1 | 9/2017 | Hanson |
| 9,794,729 | B2 | 10/2017 | Meyers et al. |
| 9,800,716 | B2 | 10/2017 | Abramson et al. |
| 9,801,027 | B2 | 10/2017 | Levy et al. |
| 9,805,601 | B1 | 10/2017 | Fields et al. |
| 9,818,239 | B2 | 11/2017 | Pal et al. |
| 9,842,120 | B1 | 12/2017 | Siris et al. |
| 9,852,475 | B1 * | 12/2017 | Konrardy ............... G05B 15/02 |
| 9,854,396 | B2 | 12/2017 | Himmelreich et al. |
| 9,868,394 | B1 | 1/2018 | Fields et al. |
| 9,870,649 | B1 | 1/2018 | Fields et al. |
| 9,888,392 | B1 | 2/2018 | Snyder et al. |
| 9,900,747 | B1 | 2/2018 | Park |
| 9,928,432 | B1 | 3/2018 | Sathyanarayana et al. |
| 9,932,033 | B2 | 4/2018 | Slusar et al. |
| 9,955,319 | B2 | 4/2018 | Matus et al. |

(56) References Cited

U.S. PATENT DOCUMENTS

| | | |
|---|---|---|
| 9,967,701 B1 | 5/2018 | Barfield |
| 9,994,218 B2 | 6/2018 | Pal et al. |
| 9,996,811 B2 | 6/2018 | Matus et al. |
| 10,012,993 B1 | 7/2018 | Matus et al. |
| 10,137,889 B2 | 11/2018 | Pal et al. |
| 10,154,382 B2 | 12/2018 | Matus |
| 10,157,423 B1 | 12/2018 | Fields et al. |
| 10,165,406 B2 | 12/2018 | Hong et al. |
| 10,176,524 B1 | 1/2019 | Brandmaier et al. |
| 10,304,329 B2 | 5/2019 | Matus et al. |
| 10,324,463 B1 | 6/2019 | Konrardy et al. |
| 10,386,192 B1 | 8/2019 | Konrardy et al. |
| 10,510,123 B1 | 12/2019 | Konrardy et al. |
| 10,533,870 B1 | 1/2020 | Slusar |
| 10,559,196 B2 | 2/2020 | Matus et al. |
| 10,733,460 B2 | 8/2020 | Heck et al. |
| 10,824,145 B1 * | 11/2020 | Konrardy ............... G08B 21/00 |
| 10,848,913 B2 | 11/2020 | Pal et al. |
| 10,872,525 B2 | 12/2020 | Xu et al. |
| 10,885,592 B2 * | 1/2021 | Hsu-Hoffman ........ G06Q 40/08 |
| 10,983,523 B2 | 4/2021 | Sim |
| 11,069,157 B2 | 7/2021 | Matus |
| 11,170,446 B1 * | 11/2021 | Thurber .................. B60L 53/00 |
| 11,175,152 B2 | 11/2021 | Pal et al. |
| 11,521,371 B2 | 12/2022 | Omari et al. |
| 11,568,434 B2 | 1/2023 | Bax et al. |
| 2002/0161517 A1 | 10/2002 | Yano et al. |
| 2002/0161518 A1 | 10/2002 | Petzold et al. |
| 2003/0018430 A1 | 1/2003 | Ladetto et al. |
| 2004/0046335 A1 | 3/2004 | Knox et al. |
| 2004/0082311 A1 | 4/2004 | Shiu et al. |
| 2005/0080555 A1 | 4/2005 | Parupudi et al. |
| 2005/0093868 A1 | 5/2005 | Hinckley |
| 2005/0197773 A1 | 9/2005 | Brewster et al. |
| 2005/0288856 A1 | 12/2005 | Ohki et al. |
| 2006/0153198 A1 | 7/2006 | Chadha |
| 2007/0005228 A1 | 1/2007 | Sutardja |
| 2007/0208494 A1 | 9/2007 | Chapman et al. |
| 2007/0208501 A1 | 9/2007 | Downs et al. |
| 2008/0033776 A1 | 2/2008 | Marchese |
| 2008/0103907 A1 | 5/2008 | Maislos et al. |
| 2008/0243439 A1 | 10/2008 | Runkle et al. |
| 2008/0312832 A1 | 12/2008 | Greene et al. |
| 2009/0024419 A1 | 1/2009 | McClellan et al. |
| 2010/0030582 A1 | 2/2010 | Rippel et al. |
| 2010/0056175 A1 | 3/2010 | Bachmann et al. |
| 2010/0100398 A1 | 4/2010 | Auker et al. |
| 2010/0106406 A1 | 4/2010 | Hille et al. |
| 2010/0131304 A1 | 5/2010 | Collopy et al. |
| 2010/0198517 A1 | 8/2010 | Scott et al. |
| 2010/0219944 A1 | 9/2010 | Mc et al. |
| 2010/0273508 A1 | 10/2010 | Parata et al. |
| 2010/0299021 A1 | 11/2010 | Jalili |
| 2010/0332131 A1 | 12/2010 | Horvitz et al. |
| 2011/0077028 A1 | 3/2011 | Wilkes et al. |
| 2011/0117856 A1 | 5/2011 | Veluppillai et al. |
| 2011/0124311 A1 | 5/2011 | Staehlin |
| 2011/0161116 A1 | 6/2011 | Peak et al. |
| 2011/0224898 A1 | 9/2011 | Scofield et al. |
| 2011/0246156 A1 | 10/2011 | Zecha et al. |
| 2011/0294520 A1 | 12/2011 | Zhou et al. |
| 2012/0050095 A1 | 3/2012 | Scherzinger et al. |
| 2012/0065871 A1 | 3/2012 | Deshpande et al. |
| 2012/0066053 A1 | 3/2012 | Agarwal |
| 2012/0071151 A1 | 3/2012 | Abramson et al. |
| 2012/0089328 A1 | 4/2012 | Ellanti et al. |
| 2012/0109517 A1 | 5/2012 | Watanabe |
| 2012/0129545 A1 | 5/2012 | Hodis et al. |
| 2012/0136529 A1 | 5/2012 | Curtis et al. |
| 2012/0136567 A1 | 5/2012 | Wang et al. |
| 2012/0149400 A1 | 6/2012 | Paek et al. |
| 2012/0158820 A1 | 6/2012 | Bai et al. |
| 2012/0197587 A1 | 8/2012 | Luk et al. |
| 2012/0226421 A1 | 9/2012 | Kote et al. |
| 2012/0245963 A1 | 9/2012 | Peak et al. |
| 2013/0006469 A1 | 1/2013 | Green et al. |
| 2013/0041521 A1 | 2/2013 | Basir et al. |
| 2013/0052614 A1 | 2/2013 | Mollicone et al. |
| 2013/0069802 A1 | 3/2013 | Foghel et al. |
| 2013/0096731 A1 | 4/2013 | Tamari et al. |
| 2013/0124074 A1 | 5/2013 | Horvitz et al. |
| 2013/0130639 A1 | 5/2013 | Oesterling et al. |
| 2013/0204515 A1 | 8/2013 | Emura |
| 2013/0211618 A1 | 8/2013 | Iachini |
| 2013/0282264 A1 | 10/2013 | Bastiaensen et al. |
| 2013/0289819 A1 | 10/2013 | Hassib et al. |
| 2013/0302758 A1 | 11/2013 | Wright |
| 2013/0316737 A1 | 11/2013 | Guba et al. |
| 2013/0317860 A1 | 11/2013 | Schumann |
| 2013/0325517 A1 | 12/2013 | Berg |
| 2013/0332357 A1 | 12/2013 | Green et al. |
| 2013/0344856 A1 | 12/2013 | Silver et al. |
| 2014/0038640 A1 | 2/2014 | Wesselius et al. |
| 2014/0046896 A1 | 2/2014 | Potter |
| 2014/0074402 A1 | 3/2014 | Hassib et al. |
| 2014/0081670 A1 | 3/2014 | Lim et al. |
| 2014/0187219 A1 | 7/2014 | Yang et al. |
| 2014/0188638 A1 | 7/2014 | Jones et al. |
| 2014/0197967 A1 | 7/2014 | Modica et al. |
| 2014/0207497 A1 | 7/2014 | Collins et al. |
| 2014/0232592 A1 | 8/2014 | Psiaki et al. |
| 2014/0244150 A1 | 8/2014 | Boesch et al. |
| 2014/0244156 A1 | 8/2014 | Magnusson et al. |
| 2014/0266789 A1 | 9/2014 | Matus |
| 2014/0288765 A1 | 9/2014 | Elwart et al. |
| 2014/0288828 A1 | 9/2014 | Werner et al. |
| 2014/0323160 A1 | 10/2014 | Venkatraman et al. |
| 2014/0358321 A1 | 12/2014 | Ibrahim |
| 2014/0358394 A1 | 12/2014 | Picciotti |
| 2015/0025917 A1 | 1/2015 | Stempora |
| 2015/0046197 A1 * | 2/2015 | Peng ..................... B60W 40/09 |
| | | 701/31.5 |
| 2015/0084757 A1 | 3/2015 | Annibale et al. |
| 2015/0087264 A1 | 3/2015 | Goyal |
| 2015/0097703 A1 | 4/2015 | Baur |
| 2015/0112731 A1 | 4/2015 | Binion et al. |
| 2015/0187146 A1 | 7/2015 | Chen et al. |
| 2015/0229666 A1 | 8/2015 | Foster et al. |
| 2015/0233718 A1 | 8/2015 | Grokop |
| 2015/0246654 A1 | 9/2015 | Tadic et al. |
| 2015/0327034 A1 | 11/2015 | Abramson et al. |
| 2015/0329121 A1 | 11/2015 | Lim et al. |
| 2015/0332407 A1 | 11/2015 | Wilson et al. |
| 2015/0334545 A1 | 11/2015 | Maier et al. |
| 2016/0021238 A1 | 1/2016 | Abramson et al. |
| 2016/0033366 A1 | 2/2016 | Liu et al. |
| 2016/0042767 A1 | 2/2016 | Araya et al. |
| 2016/0048399 A1 | 2/2016 | Shaw |
| 2016/0059855 A1 | 3/2016 | Rebhan et al. |
| 2016/0066155 A1 | 3/2016 | Fan et al. |
| 2016/0068156 A1 | 3/2016 | Horii |
| 2016/0086285 A1 | 3/2016 | Jordan et al. |
| 2016/0129913 A1 | 5/2016 | Boesen |
| 2016/0133130 A1 | 5/2016 | Grimm et al. |
| 2016/0150070 A1 | 5/2016 | Goren et al. |
| 2016/0171521 A1 | 6/2016 | Ramirez et al. |
| 2016/0174049 A1 | 6/2016 | Levy et al. |
| 2016/0189303 A1 | 6/2016 | Fuchs |
| 2016/0189442 A1 | 6/2016 | Wright |
| 2016/0225263 A1 | 8/2016 | Salentiny et al. |
| 2016/0232785 A1 | 8/2016 | Wang |
| 2016/0269852 A1 | 9/2016 | Meyers et al. |
| 2016/0272140 A1 | 9/2016 | Kim et al. |
| 2016/0282156 A1 | 9/2016 | Ott et al. |
| 2016/0325756 A1 | 11/2016 | Cordova et al. |
| 2016/0328893 A1 | 11/2016 | Cordova et al. |
| 2016/0339910 A1 | 11/2016 | Jonasson et al. |
| 2016/0358315 A1 | 12/2016 | Zhou et al. |
| 2016/0364983 A1 | 12/2016 | Downs et al. |
| 2016/0375908 A1 | 12/2016 | Biemer |
| 2016/0379310 A1 | 12/2016 | Madigan et al. |
| 2016/0379485 A1 | 12/2016 | Anastassov et al. |
| 2016/0381505 A1 | 12/2016 | Sankaran |
| 2017/0034656 A1 | 2/2017 | Wang et al. |

(56) References Cited

U.S. PATENT DOCUMENTS

| | | |
|---|---|---|
| 2017/0053461 A1 | 2/2017 | Pal et al. |
| 2017/0097243 A1 | 4/2017 | Ricci |
| 2017/0103342 A1 | 4/2017 | Rajani et al. |
| 2017/0103588 A1 | 4/2017 | Rajani et al. |
| 2017/0115125 A1 | 4/2017 | Outwater et al. |
| 2017/0116792 A1 | 4/2017 | Jelinek et al. |
| 2017/0124660 A1 | 5/2017 | Srivastava |
| 2017/0126810 A1 | 5/2017 | Kentley et al. |
| 2017/0138737 A1 | 5/2017 | Cordova et al. |
| 2017/0164158 A1 | 6/2017 | Watkins et al. |
| 2017/0178416 A1 | 6/2017 | Barreira Avegliano et al. |
| 2017/0178422 A1 | 6/2017 | Wright |
| 2017/0178424 A1 | 6/2017 | Wright |
| 2017/0210323 A1 | 7/2017 | Cordova et al. |
| 2017/0211939 A1 | 7/2017 | Cordova et al. |
| 2017/0232963 A1 | 8/2017 | Pal et al. |
| 2017/0234689 A1 | 8/2017 | Gibson et al. |
| 2017/0241791 A1 | 8/2017 | Madigan et al. |
| 2017/0279947 A1 | 9/2017 | Rajakarunanayake et al. |
| 2017/0289754 A1 | 10/2017 | Anderson et al. |
| 2017/0369055 A1 | 12/2017 | Saigusa et al. |
| 2017/0371608 A1 | 12/2017 | Wasserman |
| 2018/0061230 A1 | 3/2018 | Madigan et al. |
| 2018/0075309 A1 | 3/2018 | Sathyanarayana et al. |
| 2018/0090001 A1 | 3/2018 | Fletcher |
| 2018/0154908 A1 | 6/2018 | Chen |
| 2018/0158329 A1 | 6/2018 | Benhammou et al. |
| 2018/0165531 A1 | 6/2018 | Sathyanarayana et al. |
| 2018/0174446 A1 | 6/2018 | Wang |
| 2018/0276485 A1 | 9/2018 | Heck et al. |
| 2018/0308128 A1 | 10/2018 | Deluca et al. |
| 2019/0007511 A1 | 1/2019 | Rodriguez et al. |
| 2019/0035266 A1 | 1/2019 | Riess et al. |
| 2019/0281416 A1 | 9/2019 | Watkins et al. |
| 2019/0295133 A1 | 9/2019 | Hirtenstein et al. |
| 2021/0197720 A1 | 7/2021 | Houston et al. |
| 2021/0309261 A1 | 10/2021 | Rosales et al. |
| 2022/0005291 A1* | 1/2022 | Konrardy ............... G07C 5/008 |
| 2022/0180448 A1* | 6/2022 | Konrardy ............... G08G 1/167 |

FOREIGN PATENT DOCUMENTS

| | | |
|---|---|---|
| CN | 108819841 A | 11/2018 |
| DE | 3439000 A1 | 4/1986 |
| DE | 102008008555 | 8/2008 |
| DE | 102017221643 A1 | 7/2018 |
| EP | 0534892 A1 | 3/1993 |
| EP | 3638542 B1 | 1/2022 |
| GB | 2492369 B | 4/2014 |
| JP | 2000009482 A | 1/2000 |
| JP | 2002215236 A | 7/2002 |
| JP | 2003006439 A | 1/2003 |
| JP | 2005098904 A | 4/2005 |
| JP | 2007212265 A | 8/2007 |
| JP | 2008298475 A | 12/2008 |
| JP | 2009133702 A | 6/2009 |
| JP | 2011133240 A | 7/2011 |
| JP | 2012008675 A | 1/2012 |
| JP | 2013195143 A | 9/2013 |
| JP | 2013200223 A | 10/2013 |
| JP | 2014154005 A | 8/2014 |
| JP | 2019522295 A | 8/2019 |
| KR | 20130106106 A | 9/2013 |
| WO | 2004085220 | 10/2004 |
| WO | 2006000166 A1 | 1/2006 |
| WO | 2007066611 A1 | 6/2007 |
| WO | 2015122729 A1 | 8/2015 |
| WO | 2018002894 A1 | 1/2018 |

OTHER PUBLICATIONS

Examination Report for EP Patent Application No. 16837957.6 dated May 29, 2019.

Hon Lung Chu—"In-Vehicle Driver Detection Using Mobile Phone Sensors"—https://ece.duke.edu/sites/ece.duke.edu/files/GWDD2011_Chu.pdf—2011 (Year: 2011).

International Search Report and Written Opinion for PCT Application O. PCT/US2017/051218 dated Nov. 17, 2018.

Kalra, Nidhi, "Analyzing Driving and Road Events via Smartphone", International Journal of Computer Applications (0975-8887), vol. 98—No. 12, Jul. 2014, pp. 5-9.

Mohan Prashanth; et al. Nericell: Rich Monitoring of Road and Traffic Conditions using Mobile Smartphones, SenSys '08, Nov. 5-7, 2008, Raleigh, North Carolina.

Short et al.—"Identifying Autonomous Vehicle Technology Impacts on the Trucking Industry"—http://atri-online.org/wp-content/uploads/2016/11/ATRI-Autonomous-Vehicle Impacts-11-2016.pdf (Year: 2016).

European Patent Office Search Report for Application No. 16837957.6, dated Sep. 7, 2018.

Giuseppe, Guido , et al., "Using Smartphones as a Tool to Capture Road Traffic Attributes", University of Calabria, Department of Civil Engineering, via P.Bucci, 87036—Rende (CS) Italy, Applied Mechanics and Materials, vol. 432 (2013, Trans Tech Publications, Switzerland, pp. 513-519.

International Search Report and Written Opinion of the ISA, dated Feb. 14, 2019, for application No. PCT/US18/62665.

Japanese Office Action application No. 2018-506604, dated Jun. 4, 2019.

Walter, Debbie, et al.,"Novel Environmental Features for Robust Multisensor Navigation", Institute of Navigation GNSS + 2013, pp. 1-6.

Chandra, et al. "Method and System for Detecting Lateral Driving Behavior US Application", U.S. Appl. No. 18/115,626, filed Feb. 28, 2023.

Jiangqiang , et al., "Driver Pre-Accident Operation Mode Study Based on Vehicle-Vehicle Traffic Accidents", 2011, Publisher: IEEE.

Liang-Bi , et al., "An Implementation of Deep Learning based IoV System for Traffic Accident Collisions Detection with an Emergency Alert Mechanism", 2018, Publisher: IEEE.

Pattara-Atikom, W. , et al., "Estimating Road Traffic Congestion using Vehicle Velocity", 2006, Publisher: IEEE.

Walter D et al: "Novel Environmental Features for Robust Multisensor Navigation", GNSS 2013—Proceedings of the 26th International Technical Meeting of the Satellite Division of the Institute of Navigation, Manassas, VA, Sep. 20, 2013.

* cited by examiner

METHOD AND SYSTEM FOR RISK MODELING IN AUTONOMOUS VEHICLES

CROSS-REFERENCE TO RELATED APPLICATIONS

This application is a continuation of U.S. patent application Ser. No. 16/000,675, filed Jun. 5, 2018, which is a continuation of U.S. patent application Ser. No. 15/835,284, filed Dec. 7, 2017, which claims the benefit of U.S. Provisional Patent application Ser. No. 62/431,949, filed Dec. 9, 2016, all of which are incorporated in their entirety by this reference.

TECHNICAL FIELD

This invention relates generally to the vehicle telematics field, and more specifically to a new and useful method and system for risk modeling in the vehicle telematics field.

BACKGROUND

Autonomous and semi-autonomous vehicles require robust systems for handling and responding to various conditions and hazards in their environments. Media responses to recent incidents involving current autonomous and/or semi-autonomous vehicles have focused on system-attributable failures (e.g., energy storage issues, semi-autonomous mode related incidents, etc.); however, without technology developments related to adaptive risk mitigation, future incidents will draw into question the ability of such autonomous systems to handle real-world driving conditions and hazards in a safe manner. In particular, improved risk modeling that can be used to provide adaptive and appropriate responses to transit-related factors in a timely manner will be crucial.

Current algorithms and systems, while under a state of improvement, currently lack an ability adequately account for or adapt to risks attributed to human factors, non-human factors, environmental factors, and other factors in an adaptive, comprehensive, and suitably responsive manner. Thus, there is a need in the vehicle telematics field to create a new and useful method and system for adaptive risk modeling. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1A:
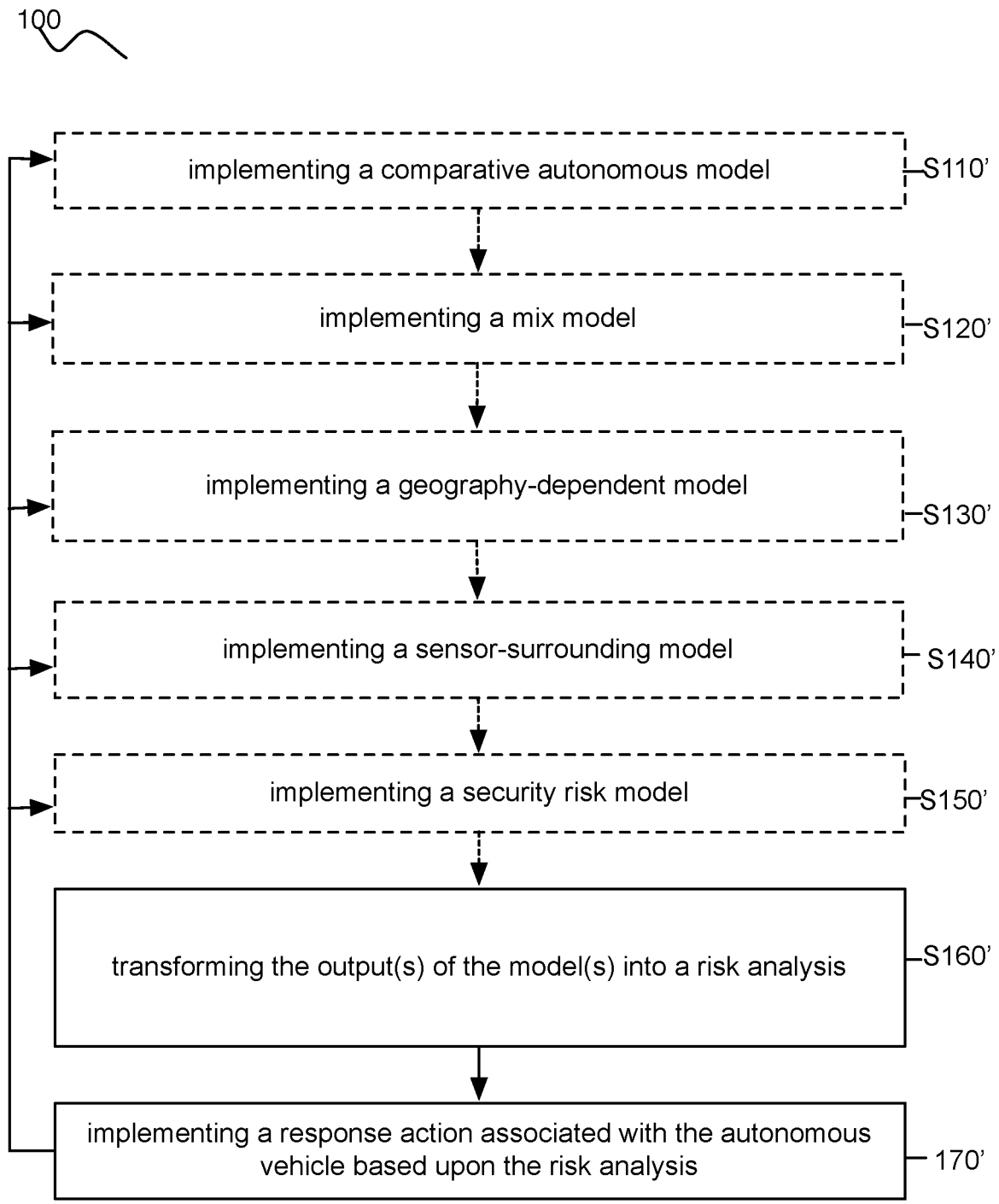
FIGS. 1A-1C depict flowcharts of embodiments of methods for autonomous vehicle risk modeling.
Figure 1B:
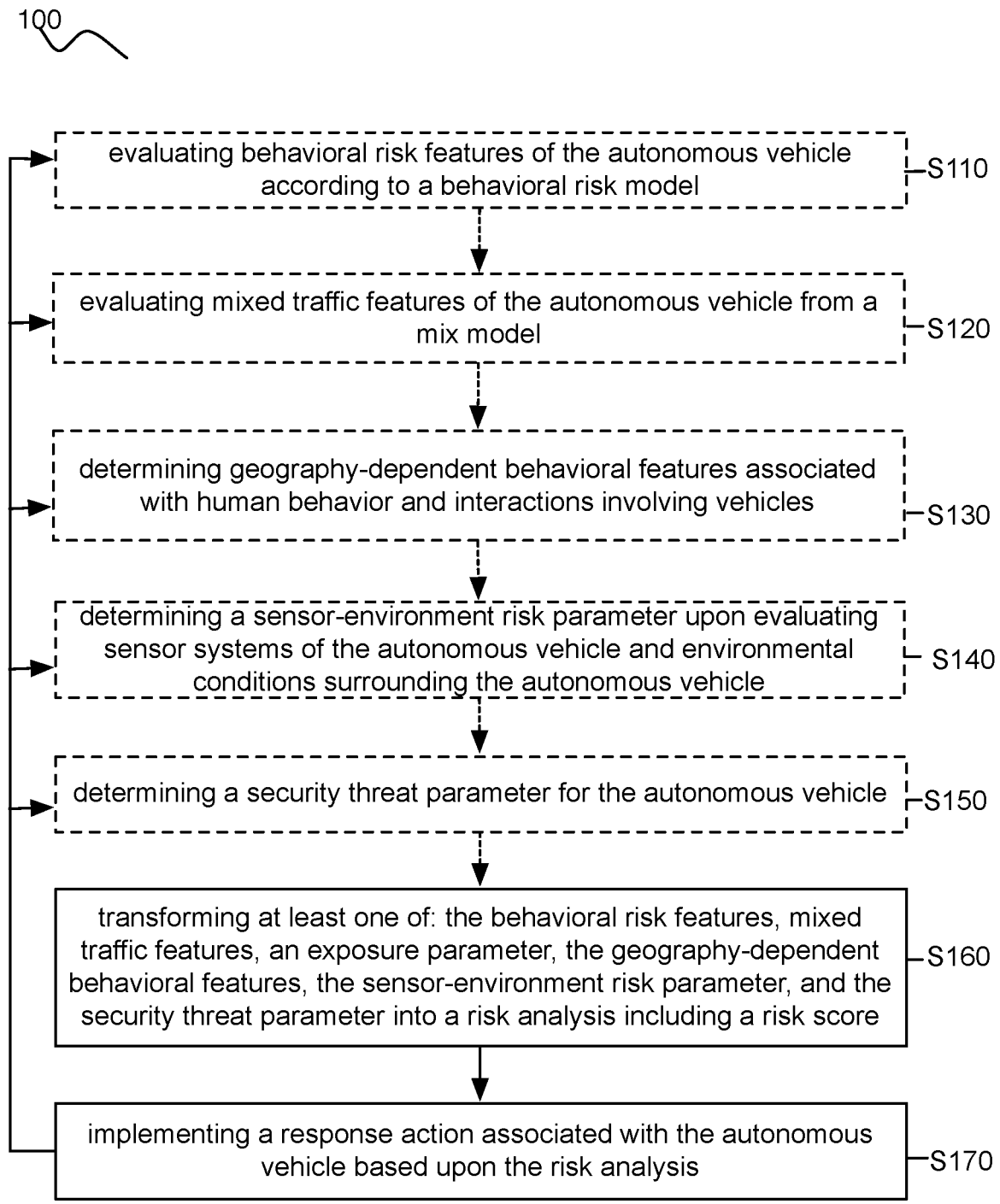
Figure 2A:
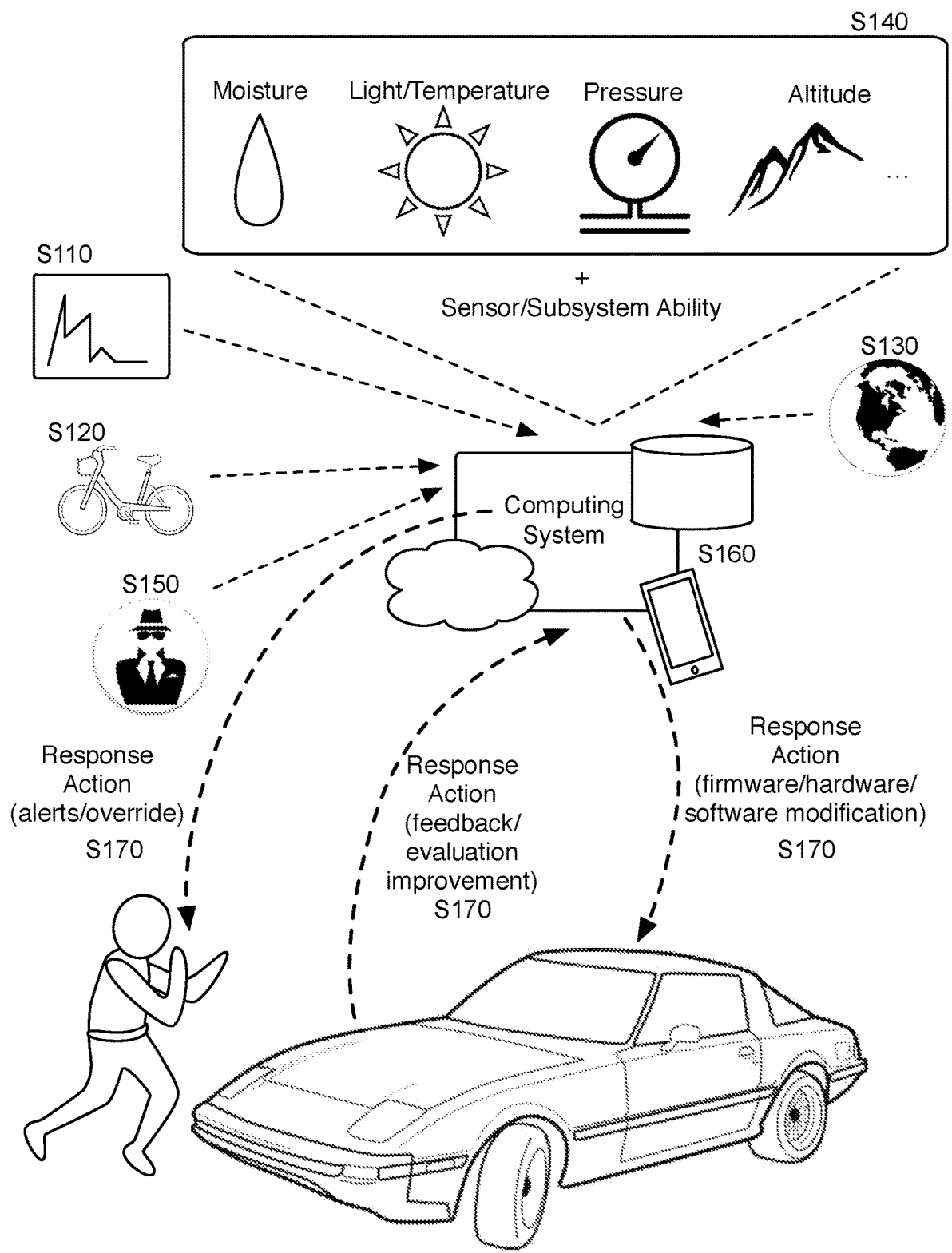
FIGS. 2A and 2B are schematics of a method and system for autonomous vehicle risk modeling.

As shown in FIGS. 1A, 1B, and 2A, a method 100 for adaptive risk modeling for an autonomous vehicle includes: evaluating behavioral risk features of the autonomous vehicle according to a comparative autonomous model S110, S110'; evaluating mixed traffic features of the autonomous vehicle from a mix model S120, S120'; determining geography-dependent behavioral features associated with a geography-dependent model S130, S130'; determining a surrounding risk parameter upon evaluating sensor systems of the autonomous vehicle and environmental conditions surrounding the autonomous vehicle with a sensor-surrounding model S140, S140'; determining a security threat parameter for the autonomous vehicle with a security risk model S150, S150'; transforming outputs of the comparative autonomous model, the mix model, the geography-dependent model, the sensor-surrounding model, and the security risk model, with an exposure parameter, into a risk analysis S160, S160'; and implementing a response action associated with the autonomous vehicle based upon the risk analysis S170, S170'.

Figure 1C:
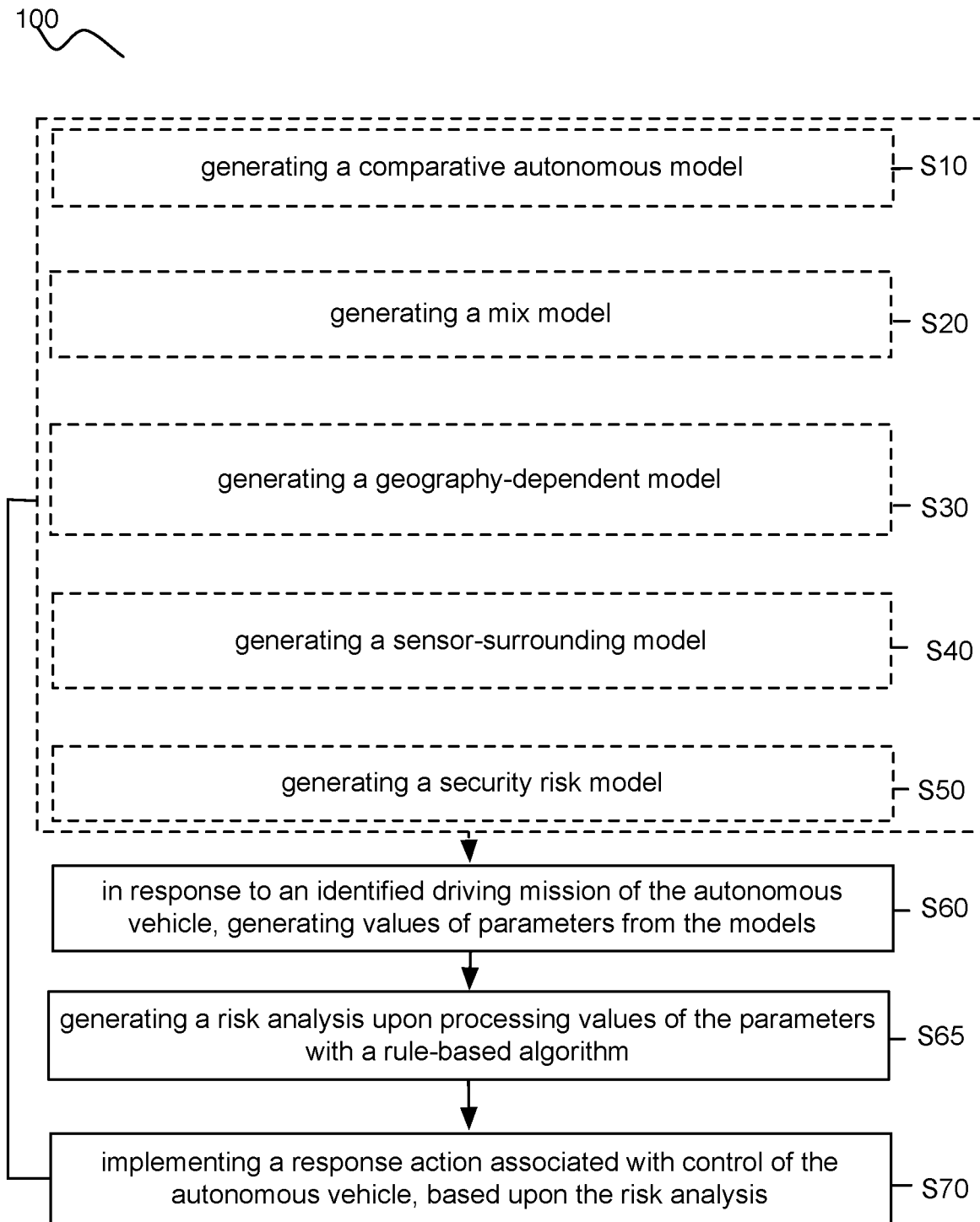

In one embodiment, as shown in FIG. 1C, the method 100 can include one or more of: generating models including: a comparative autonomous model S10 that compares autonomous vehicle operation to human driving operation in a set of driving scenarios, a mix model S20 characterizing operation of the autonomous vehicle in mixed-traffic driving scenarios, a geography-dependent model S30 characterizing geographic location-specific acceptable driving behaviors, a sensor-surrounding model S40 characterizing surroundings of the autonomous vehicle, and a security risk model S50 characterizing security risks of the autonomous vehicle; in response to an identified driving mission of the autonomous vehicle, generating values of: a comparative autonomous parameter, a mix model parameter, a surrounding risk parameter, a geographic operation parameter, and a security risk parameter upon evaluating situational inputs associated with the identified driving mission with the comparative autonomous model, the mix model, the sensor-surrounding model, the geography-dependent model, and the security risk model S60; upon generating values, generating a risk analysis upon processing values of the comparative autonomous parameter, the mix model parameter, the surrounding risk parameter, the geographic operation parameter, and the security risk parameter with a rule-based algorithm S65; and contemporaneously with execution of the identified driving mission, implementing a response action associated with control of the autonomous vehicle, based upon the risk analysis S70.

The method 100 and/or associated systems function to provide a methodology for assessing the safety of autonomous vehicle functions (e.g., auto-pilot functions) based upon real life data in specific locations and/or generalized locations, in order to improve autonomous vehicle function (e.g., auto-pilot function, etc.). Development of assessments and implementation/testing of response can additionally or alternatively be used to increase adaptability of autonomous vehicles to risks in real-time (or near-real time) in order to improve autonomous vehicle safety in real world situations. In specific applications, the method(s) 100 described herein can implement sensor systems (e.g., optical sensors, radar modules, microphones, etc.) to collect data describing real-world driving situations associated with different environments and/or human behavioral factors, and test autonomous vehicle function such situations (simulated or actual). Additionally or alternatively, in specific applications, the method(s) 100 described herein can implement supplementary data extraction systems associated with the autonomous vehicle(s) to retrieve, and transform information (e.g., using APIs) associated with geographically idiosyncratic driving/traffic/pedestrian behaviors or other driving formalities, in a manner that results in improved control of the autonomous vehicle(s). Additionally or alternatively, in specific applications, the method(s) 100 described herein can implement security diagnostic systems associated with the autonomous vehicle(s) to generate, retrieve, and transform information associated with security assessments of the systems of the autonomous vehicle(s), in a manner that results in improved control of the autonomous vehicle(s) relative to security threats.

The method 100 further functions to leverage the availability of position, velocity, and/or acceleration (PVA) data from multiple data sources (and potentially the distinct set of abilities available to each of those sources) to evaluate and/or improve operation of autonomous vehicles in real-world situations. Note that throughout this disclosure, the term PVA data refers to any data related to the position, velocity, and/or acceleration of the system operating the method 100 (or of an associated vehicle). For example, in some cases PVA data may include only acceleration data (and not position/velocity data). The method 100 may additionally or alternatively leverage the availability of additional data captured by the data sources (e.g., audio data, vehicle sensor data, etc.).

One or more instances of the method 100 and/or processes described herein can be performed asynchronously (e.g., sequentially), concurrently (e.g., in parallel; concurrently on different threads for parallel computing to improve system processing ability for determining device association conditions, and/or other suitable data; etc.), in temporal relation to a trigger event, and/or in any other suitable order at any suitable time and frequency by and/or using one or more instances of the system 200, elements, and/or entities described herein. Additionally or alternatively, data described herein (e.g., movement data, vehicle movement characteristics, environmental surrounding characteristics, security risk data, geographically-dependent characteristics, etc.) can be associated with any suitable temporal indicators (e.g., seconds, minutes, hours, days, weeks, etc.; temporal indicators indicating when the data was collected, determined and/or otherwise processed; temporal indicators providing context to content described by the data, such as temporal indicators indicating the time at which a vehicle exhibited the vehicle movement characteristics associated with the temporal indicators; etc.) and/or change in temporal indicators (e.g., data over time; change in data; data patterns; data trends; data extrapolation and/or other prediction; etc.). However, the method 100 and/or systems can be configured in any suitable manner.

The method 100 is preferably implemented using autonomous vehicle systems, computing systems, and elements that are in communication with and/or integrated with one or more autonomous vehicles undergoing risk-modeling and/or response modification according to the method 100. In variations, the autonomous vehicle system(s) and/or computing system(s) can include or communicate with one or more of: onboard computing systems integrated with the vehicle(s), onboard sensor modules integrated with the vehicle(s), onboard output devices (e.g., speakers, displays, haptic systems, vehicle internal environment control systems, etc.) integrated with the vehicle(s), computing systems of devices (e.g., wearable computing devices, mobile computing devices, etc.) within or near the vehicle(s), sensor modules of devices (e.g., e.g., speakers, displays, haptic systems, vehicle internal environment control systems, etc.), wearable computing devices, mobile computing devices, etc.) within or near the vehicle(s), output devices of devices (e.g., wearable computing devices, mobile computing devices, etc.) within or near the vehicle(s), remote servers, remote computing systems, cloud-based computing systems, and/or any other suitable computing/sensor elements.

Figure 2B:
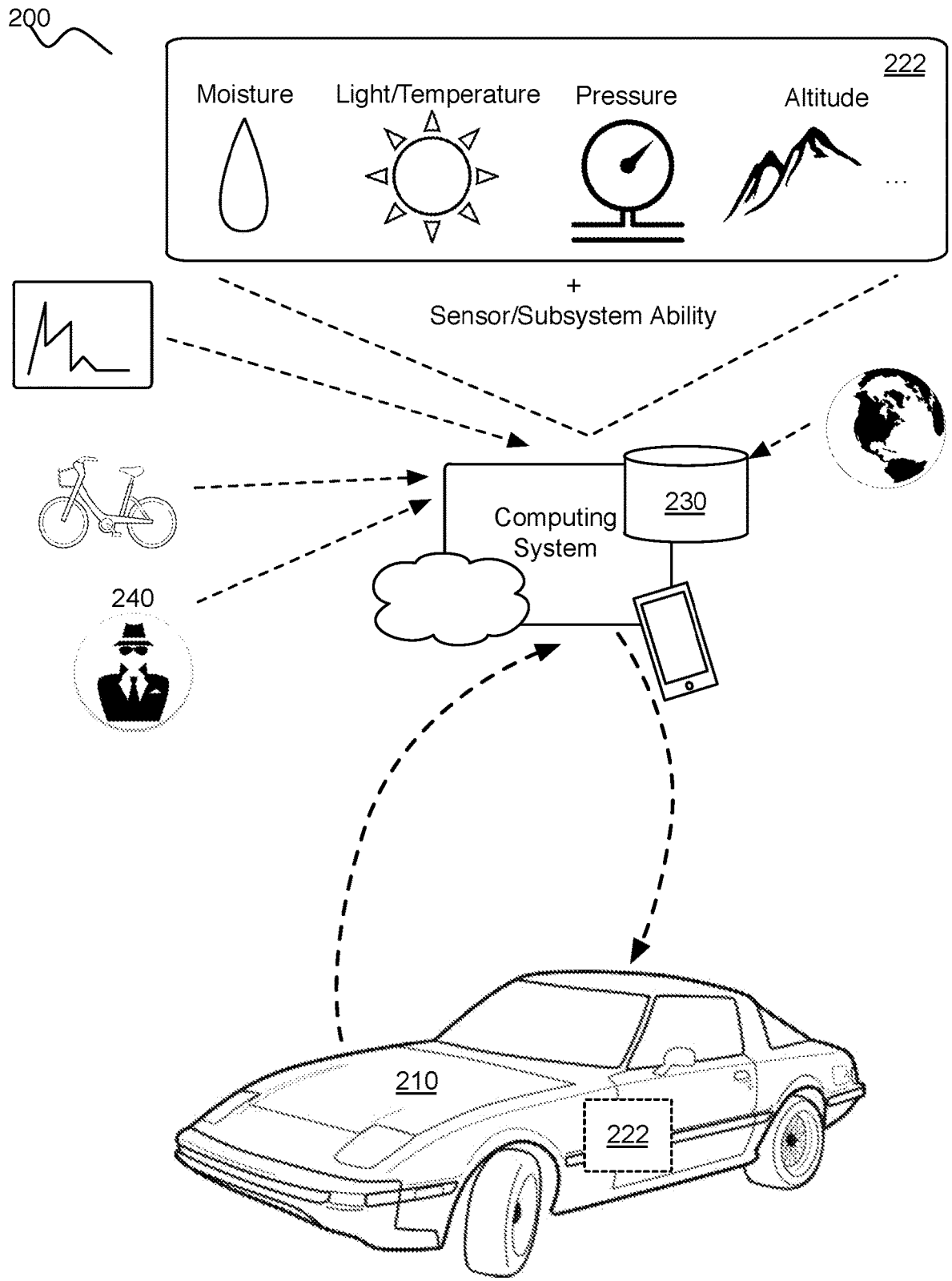

In one embodiment, as shown in FIGS. 2A and 2B, a system 200 associated with the method 100 can include one or more of: an autonomous vehicle 210; a sensor system associated with the autonomous vehicle and comprising a first set of vehicle system sensors 221 and a second set of vehicle environment sensors 222; a supplementary data extraction system 230 for retrieving geographically-dependent driving information; and a security diagnostic system 240 of the autonomous vehicle; wherein the system is operable between: a risk analysis mode wherein the system generates a set of models from the sensor system, the supplementary data extraction system, and the security diagnostic system, processes parameters of an identified driving mission with the set of models; and outputs a risk analysis according to a rule-based algorithm, and a response action mode that transforms the risk analysis into a vehicle control schematic and contemporaneously with execution of the identified driving mission, implements the vehicle control schematic with control interfaces of the autonomous vehicle.

The system 200 can additionally or alternatively include elements of the system(s) described in one or more of: U.S. application Ser. No. 14/566 titled "System and Method for Assessing Risk Through a Social Network" and filed on 10 Dec. 2014, U.S. application Ser. No. 14/206,721 titled "System and Method for Determining a Driver in a Telematic Application" and filed on 12 Mar. 2014, U.S. application Ser. No. 15/243,513 titled "Method for Accelerometer-Assisted Navigation" and filed on 22 Aug. 2016, U.S. application Ser. No. 15/243,565 titled "Method for Smartphone-Based Accident Detection" and filed on Aug. 22, 2016, and U.S. application Ser. No. 15/702,601 titled "Method for Mobile Device-Based Cooperative Data Capture" and filed on Sep. 12, 2017, which are herein incorporated in their entireties by this reference. However, the method 100 can additionally or alternatively be implemented using any other suitable system(s).

2. Benefits

In specific examples, the method 100 and/or system 200 can confer several benefits over conventional methodologies. In specific examples, the method 100 and/or system 200 can perform one or more of the following:

First, the technology can confer improvements in computer-related technology (e.g., vehicle telematics, computational modeling associated with vehicle movement characteristics, etc.) by leveraging non-generic location data (e.g., GPS data), motion data (e.g., accelerometer data, gyroscope data), and/or other suitable data from a plurality of mobile devices (e.g., non-generalized mobile devices), sensor systems associated with the vehicle and/or surroundings of the vehicle, security diagnostic systems, and any other suitable systems to improve accuracy of risk assessments related to driving missions of the autonomous vehicle and/or vehicle movement characteristics (e.g., which can thereby enable appropriately generated and/or timed user-related actions). In examples, the technology can confer improvements in the application of such technology by enabling convenient and unobtrusive autonomous vehicle control, as well as improved autonomous vehicle control over time, through passively collected data. As such, that the technology can be applied, in examples, without requiring a user to purchase additional hardware.

Second, the technology can automatically initiate autonomous vehicle operation modifications and/or user-related actions based on the improved accuracy in risk assessments (e.g., which can be determined in substantially real-time). For example, correction of deviations in proper vehicle operation can be initiated, using interfaces to control systems of the autonomous vehicle, in response to detection of one or more risks surpassing defined thresholds.

Third, the technology can provide technical solutions necessarily rooted in computer technology (e.g., utilizing different computational models to determine vehicle operation risk analyses and movement characteristics based on data streams from sensor systems, etc.) to overcome issues specifically arising with computer technology (e.g., issues surrounding how to leverage a plurality of autonomous vehicle-associated datastreams collected by a plurality of computing devices; issues surrounding accurately and appropriately initiating response actions for different vehicular situations; etc.). In another example, the technology can apply computer-implemented rules (e.g., feature engineering rules for processing movement data and/or supplementary data into an operable form for generating features; operator preference rules for determining the types of data that are permitted to be collected; data collection and/or processing rules for data from associated computing devices, mobile devices, sensor systems; etc.).

Fourth, the technology can confer improvements in the functioning of computational systems themselves. For example, the technology can improve upon the processing of collected non-generic data (e.g., stored in association with personalized user accounts as a cohesive database system) by improving storage and retrieval of different models tailored for device association condition determination and/or vehicle operation risk characteristic determination (e.g., selecting and retrieving risk analysis model components indicated above and described below, etc.).

Fifth, the technology can amount to an inventive distribution of functionality across a network including a plurality of devices, vehicle computing systems, mobile devices associated with a moving vehicle, and a vehicle movement determination system (e.g., a remote computing system, etc.), where, for example, movement data collection functionality can be performed by the plurality of mobile devices, and determination of device association conditions, vehicle movement characteristics, and/or other data can be determined by the vehicle movement determination system. In examples, functionality associated with portions of the method 100 can be distributed in any suitable manner (e.g., where one or more devices or computing subsystems of the system can determine risk analysis parameter values, vehicle movement characteristics, response actions, etc.).

Sixth, the technology can leverage specialized computing devices (e.g., an autonomous vehicle computing platform including a network of mobile devices with GPS location capabilities; sensor devices with varied functionalities, etc.) to collect specialized datasets for subsequent processing.

Seventh, adaptations of the technology can benefit non-autonomous or semi-autonomous vehicle operation applications. In an example, driving guidance (e.g., to improve safety, fuel efficiency, etc.) can be provided in real-time to a driver at a driver mobile device (e.g., classified as associated with the driver based on data collected from a plurality of mobile devices, the vehicle system platform, etc.) based on the risk assessments. In another example, improved insurance processing can be facilitated by the improved accuracy of vehicle movement characteristics describing the movement of the vehicle and/or other vehicles.

The technology can, however, provide any other suitable benefit(s) in the context of using non-generalized computer systems for determining, using, and/or otherwise processing vehicle movement characteristics.

3. Method

3.1 Method—Behavioral Risk Analysis Using Comparative Autonomous Model

Block S110 recites: evaluating behavioral risk features according to a comparative autonomous model, which functions to incorporate features associated with more intense driving maneuvers into risk evaluations of the autonomous vehicle. As such, Block S110 can include collecting data and processing data with the comparative autonomous model to produce one or more outputs (e.g., parameter values) that can be further transformed into the risk analysis in downstream portions of the method 100. Block S110 preferably includes implementing a comparative autonomous model that compares autonomous vehicle behavior to human driver behavior (e.g., an "average human" behavior determined upon analyzing responses of a population of humans) across different driving maneuvers. Preferably, the driving maneuvers of Block S110 include driving maneuvers having a higher degree of severity or other kinematic characteristics surpassing a certain threshold (e.g., driving above a specific velocity threshold, abrupt changes in velocity, abrupt changes in direction, etc.) in relation to magnitude and/or changes in position, velocity, and/or acceleration of the autonomous vehicle. However, the driving maneuvers of Block S110 can additionally or alternatively include driving maneuvers having a less high degree of severity (e.g., driving below a specific velocity threshold, non-abrupt changes in velocity, non-abrupt changes in direction, etc.)

In relation to Block S110, the method 100 can include or otherwise be associated with Block S10, which recites: generating a comparative autonomous model that compares autonomous vehicle operation to human driving in a set of driving scenarios. In relation to model generation, Blocks S10 and S110 can include extracting PVA data associated with different higher intensity driving maneuvers (or other driving maneuvers, as indicated above). As such, Block S110 can include collecting one or more of: vehicle position data, vehicle velocity data, vehicle acceleration data, from one or more position/velocity/acceleration (PVA) data collecting modules (e.g., GPS modules, beacon systems, Bluetooth units, accelerometers, gyroscopes, optical sensors, radar units, LiDAR units, microphones, etc.) of systems integrated with or otherwise associated with the vehicle as described above. Extraction can be implemented by accessing data derived from mobile devices on-board or otherwise associated with the vehicle, as described in one or more of the incorporated applications. Additionally or alternatively, extraction can be implemented directly using computing interfaces to one or more sensor subsystems indicated above, or indirectly through software programming interfaces (e.g., application programming interfaces, etc.).

Generation of the comparative autonomous model can include implementing approaches including or derived from one or more of the following: probabilistic properties, heuristic properties, deterministic properties, and/or other portions of the method 100, and/or any other suitable properties. Models described herein can employ one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and/or any suitable form of machine learning algorithm. As such, in variations, model generation can include extracting data, developing an architectural structure of the model, and training the model with training data to improve the model.

Block S110 preferably includes collecting data informative of magnitude and changes (relative to time, relative to location, relative to other factors) in PVA components; however, Block S110 can include collecting any other suitable data that can be used to assess driving maneuvers in order to compare autonomous vehicles to an "average human" benchmark. Block S110 can additionally or alternatively implement methods for PVA data collection described in U.S. application Ser. No. 14/206,721 filed on Mar. 12, 2014 and titled "System and Method for Determining a Driver in a Telematic Application", U.S. application Ser. No. 15/243,513 filed on 22 Aug. 2016 and titled Method for Accelerometer-Assisted Navigation", and/or U.S. application Ser. No. 15/243,565 filed on 22 Aug. 2016 and titled "Method for Smartphone-based Accident Detection", which are each incorporated in their entireties by this reference.

In relation to the driving maneuvers assessed, Blocks S10 and Silo can additionally or alternatively include collecting data associated with factors (e.g., environmental factors, human factors, vehicle system factors, etc.) that triggered performance of such maneuvers. In variations, collecting data associated with environmental factors can include implementing one or more of: optical sensors (e.g., camera modules, infrared sensors, etc.), radar modules, LiDAR modules, pressure sensors, moisture sensors, temperature sensors, any other suitable sensors, vehicle subsystem states (e.g., windshield wiper states, AC/heater states, lighting system states, cruise control system states, gear shifting states, overdrive states, etc.), and any other suitable component that can be used to detect weather and/or road conditions conducive to triggering different driving behaviors. In specific examples, Block S110 can include processing data components from multiple sources to extract and determine a weather condition factor (e.g., rain, fog, high temperatures, etc.) and/or road condition factor (e.g., winding roads, rough roads, etc.) and associate such determined conditions with the driving maneuver response.

Additionally or alternatively, in variations, collecting data associated with human factors can include implementing one or more of: optical sensors (e.g., camera modules, infrared sensors, etc.), radar modules, LiDAR modules, motion sensors, vehicle subsystem states, states of devices (e.g., mobile computing devices, wearable computing devices, biometric monitoring devices, etc.) and/or digital applications executing on such devices within the vehicle, and any other suitable component that can be used to detect human factors (e.g., pedestrian factors, vehicle occupant factors) conducive to triggering different driving behaviors. In specific examples, Block S110 can include processing data components from multiple sources to extract and determine a human factor (e.g., pedestrian/animal obstacle, vehicle occupant distraction state, etc.) and associate such determined conditions with the driving maneuver response.

Additionally or alternatively, in variations, collecting data associated with vehicle system factors can include implementing an on-board diagnostic (OBD) module including hardware components from which vehicle subsystem states can be assessed to identify vehicle system factors conducive to triggering different driving behaviors. In variations, the OBD module can have any of the following interfaces with the vehicle: an assembly line diagnostic link (ALDL) interface, an OBD-1 interface, an OBD-1.5 interface, an OBD-II interface, a European OBD interface, a Japanese OBD interface, an ADR79 interface, and any other suitable interface that allows access and detection of vehicle subsystem statuses. In specific examples, the OBD modules can include one of: an Automatic OBD adaptor (i.e., from Automatic Labs) and a Metromile OBD adaptor (i.e., from Metromile, Inc.) that plugs into an OBD port of the vehicle and communicates with a mobile computing device of the computing system (e.g., by way of a Bluetooth connection, by way of any other wireless connection, by way of a wired connection, etc.) in transmitting an output associated with a vehicle subsystem state.

In relation to rating autonomous vehicle behavior against human behavior in different high intensity driving maneuvers, the comparative autonomous model implemented in Block S110 can generate comparisons across different metrics related to one or more of: safety (e.g., outcome of maneuver), vehicle system load, proper selection of an implemented maneuver from various alternative maneuvers, and any other suitable metric for evaluating performance of a high intensity maneuver. For instance, in relation to safety, Block S110 can include evaluating vehicle occupant harm (e.g., in terms of injury presence, in terms of an injury severity metric, etc.) and/or damage to non-vehicle occupants (e.g., other traffic, pedestrians, property, etc.) in terms of metrics (e.g., damage valuation metric, injury treatment cost metric, etc.) due to the driving maneuver for both the autonomous vehicle and for the "average human" benchmark. Then Block S110 can compare values of the metric between the autonomous vehicle and for the "average human" benchmark.

Additionally or alternatively, in relation to vehicle system load, Block S110 can include evaluating stress on vehicle subsystems (e.g., forces incurred by different vehicle mechanical subsystems, electrical load incurred by different vehicle electronic subsystems, processing load incurred by different vehicle computing subsystems) due to the driving maneuver for both the autonomous vehicle and for the "average human" benchmark. Then Block S110 can compare values of the metric between the autonomous vehicle and for the "average human" benchmark.

Additionally or alternatively, in relation to maneuver selection, Block S110 can include evaluating appropriateness of different maneuver options that could have been used to respond to the triggering event, for both the autonomous vehicle and for the "average human" benchmark. In an example of a road obstruction, Block S110 can include ranking maneuvers (e.g., swerving, running through the obstacle, braking abruptly, etc.), and determining a value of a metric for maneuver appropriateness based upon the ranking of the selected maneuver. Then Block S110 can compare values of the metric between the autonomous vehicle and for the "average human" benchmark.

The outputs(s) of the comparative autonomous model provided by Block S110 can additionally or alternatively be derived from methods described in U.S. application Ser. No. 14/206,721 filed on 12 Mar. 2014 and titled "System and Method for Determining a Driver in a Telematic Application" and/or U.S. application Ser. No. 15/243,513 filed on 22 Aug. 2016 and titled Method for Accelerometer-Assisted Navigation", which are herein incorporated in their entireties by this reference, or in any other suitable manner.

3.2 Method—Mixed Traffic Analysis Using Mix Model

Block S120 recites: evaluating mixed traffic features from a mix model, which functions to incorporate features associated with mixed traffic factors into risk evaluations of the autonomous vehicle, and to ultimately evaluate the ability of the autonomous vehicle to handle mixed-traffic situations. As such, Block S120 can include collecting data and processing data with the mix model to produce one or more outputs (e.g., parameter values) that can be further transformed into the risk analysis in downstream portions of the method 100. Block S120 preferably evaluates the ability of the autonomous vehicle to appropriately function within mixed traffic involving two or more of: human drivers of vehicles, computer drivers of vehicles, pedestrians, cyclists, and motorcyclists. Block S120 can additionally or alternatively evaluate the ability of the autonomous vehicle to appropriately function within mixed traffic involving: different vehicle types different vehicle types (e.g., compact cars, mid-size, large, SUV, convertible, sedan, truck, commercial car, carts, etc.), non-human powered vehicles, human-powered transportation modes (e.g., bicycles, skateboards, skates, etc.), and/or any other suitable type of mixed traffic.

In relation to Block S120, the method 100 can include or otherwise be associated with Block S20, which recites: generating a mix model characterizing operation of the autonomous vehicle in mixed-traffic driving scenarios. In relation to model generation, Blocks S20 and S120 can include extracting data associated with mixed traffic vehicle operations. In Blocks S20 and S120, ability to handle mixed traffic is preferably evaluated by the mix model with collection of PVA data, OBD data, sensor data, and/or any other suitable data (e.g., provided by a human occupant) that is indicative of vehicle operation with surrounding traffic, collision occurrence, collision avoidance, near-collision occurrence, near-collision avoidance, transitions in state from a computer-driven state to a human-driven state (e.g., from operator state-recording units of the autonomous vehicle), and any other suitable mixed traffic-associated vehicle operation. Similar to Block S110, generation of the mix model can include implementing machine learning and/or other described approaches for model generation. In variations, model generation can thus include extracting data, developing an architectural structure of the model, and training the model with training data to improve the model.

In relation to data collection, Blocks S20 and/or S120 can include recording and/or determining human factors or environmental factors associated with a mixed traffic incident. Furthermore, in relation to the mixed traffic situations encountered, Block S120 can include determining qualities of the mixed traffic situation, in order to provide more context for appropriateness of autonomous vehicle responses in the mixed traffic conditions. For instance, Block S120 can include determining distribution of vehicle types (e.g., computer-driven vehicles vs. human-driven vehicles, vehicles vs. pedestrians, vehicles vs. mopeds, etc.) from image/video data of the location (e.g., satellite image data, drone data), determining density of vehicles in a given area, determining quality of infrastructure (e.g., existence of bike lanes, road narrowness, road physical condition, etc.) that would affect mixed traffic interactions, and/or any other suitable factor that provides context for the mixed traffic driving situation.

Block S120 preferably includes evaluating positive and negative events associated with the autonomous vehicle in mixed traffic situations (e.g., based on tagging of data events associated with mixed traffic situations), in order to determine the ability and/or ultimately improve the ability of the autonomous vehicle to handle such mixed traffic situations. In examples, positive incidents associated with a mixed traffic can include one or more of: successful avoidance of a collision with another vehicle/pedestrian/animal/human-powered transportation (e.g., determined by a lack of PVA or other sensor data indicative of a collision), successful avoidance of a near-collision with another vehicle/pedestrian/animal/human-powered transportation (e.g., determined by a lack of PVA or other sensor data indicative of a near-collision in combination with video/audio data indicative of a near-collision situation), performance of a driving maneuver appropriate for the mixed traffic situation successfully without need or desire for human-override, and any other positive incident. In examples, negative incidents associated with a mixed traffic situation can include one or more of: unsuccessful avoidance of a collision with another vehicle/pedestrian/animal/human-powered transportation (e.g., determined by PVA or other sensor data indicative of a collision), unsuccessful avoidance of a near-collision with another vehicle/pedestrian/animal/human-powered transportation (e.g., determined by PVA or other sensor data indicative of a near-collision in combination with video/audio data indicative of a near-collision situation), performance of a driving maneuver inappropriate for the mixed traffic situation, transitioning to a human-overridden state due to delayed response to a situation requiring a response, and any other negative incident.

In evaluating autonomous vehicle ability in Block S120, Block S120 can include determining values of metrics (e.g., number of positive incidents, number of negative incidents, severity of negative incidents, appropriateness of positive incidents, etc.) in relation to a time variable and/or in relation to a distance variable. For instance, Block S120 can include collecting data, processing data to determine metrics associated with mixed traffic events, and then determining values of metrics in relation to time (e.g., per hour of driving, per day of driving, per month of driving, per year of driving), in relation to frequency (e.g., average amount of time between positive incidents, average amount of time between negative incidents, etc.), in relation to distance (e.g., per mile driven, per 10 miles driven, per 100 miles driven, etc.), and/or any other suitable variable.

However, Block S120 can include evaluation of mixed traffic handling by the autonomous vehicle in any other suitable manner, and variations of mixed traffic situations and collision detection are further described in U.S. application Ser. No. 15/243,565 filed on 22 Aug. 2016 and titled "Method for Smartphone-based Accident Detection".

3.3 Method—Geography-Dependent Analysis Using Geography-Dependent Model

Block S130 recites: determining geography-dependent behavioral features with a geography-dependent model associated with traffic interactions involving vehicles, which functions to incorporate human behavioral components into risk evaluations of the autonomous vehicle. As such, Block S130 can include collecting data and processing data with the geography-dependent model to produce one or more outputs (e.g., parameter values) that can be further transformed into the risk analysis in downstream portions of the method 100. Block S130 preferably implements a supplementary data extraction system (e.g., implementing an application programming interface to access such geography-dependent driving behaviors, etc.), but can additionally or alternatively include detecting such behaviors and habits within a geographic location using one or more sensors (e.g., optical sensors that provide image and video data of behaviors, etc). Block S130 can, however, be implemented in any other suitable manner.

In relation to Block S130, the method 100 can include or otherwise be associated with Block S30, which recites: generating a geography-dependent model S30 characterizing geographic location-specific acceptable driving behaviors. In relation to model generation, Blocks S30 and S130 can include generating and implementing a model accounting for local driving, traffic, and/or pedestrian habits including one or more of: geographically-driven human driving behaviors, geographically-driven pedestrian behaviors, and/or any other suitable geographically or culturally-dependent factors associated with vehicle operation, in relation to evaluation of risk and vehicle performance. In variations, Blocks S30 and S130 can include extracting data identifying the location of the autonomous vehicle as described above (e.g., by implementing system components interfacing with or otherwise including GPS components, components useful for triangulation, etc.), based upon the location of the autonomous vehicle, extracting and aggregating characteristics of geographically-driven driving-related behaviors; and evaluating performance of the autonomous vehicle against those characteristics. Similar to other portions of the method 100, generation of the geography-dependent model can include implementing machine learning and/or other described approaches for model generation. In variations, model generation can thus include extracting data, developing an architectural structure of the model, and training the model with training data to improve the model.

Blocks S30 and S130 can thus include extracting and processing characteristics of geographically-driven driving "norms", and evaluating the ability of the autonomous vehicle to drive appropriately according to the characteristics across different metrics. In specific examples, characteristics of geographically-driven driving "norms" can include one or more of: right-of-way determination (e.g., right-of-way priority for vehicles, right-of-way priority for marked vehicles, right-of-way priority for pedestrians, right-of-way priority for scooters, right-of-way in turns, etc.); cutting-off-vehicle behavior (e.g., cutting off drivers is more appropriate in some Asian countries than in the U.S., etc.); tailgating vehicle behavior; traffic sign/signal observation; lane observation; round-about driving behavior; cultural aspects of saving face applied to driving behavior; public transportation infrastructure integrated with roads (e.g., tracks that cross or are adjacent to driving roads); level of aggression in driving behavior; driving lane configuration (e.g., driving on the right vs. left side of the road, etc.); and any other suitable characteristics of geography-dependent driving behavior.

Block S130 can additionally or alternatively include aggregating characteristics of geographically-driven pedestrian behavior "norms", and evaluating the ability of the autonomous vehicle to drive appropriately according to the characteristics across different metrics. In specific examples, characteristics of geographically-driven driving "norms" can include one or more of: eye contact behavior between drivers and pedestrians (e.g., eye contact establishes cordiality, etc.); right-of-way determination (e.g., right-of-way priority for vehicles vs. right-of-way priority for pedestrians or right-of-way priority for scooters, etc.); pedestrian/bicycle accommodating infrastructure factors; pedestrian density factors; pedestrian number; traffic sign/signal observation in relation to pedestrians; level of aggression in driving behavior with pedestrian interactions; and any other suitable characteristics of geography-dependent pedestrian behavior.

In evaluating performance of the autonomous vehicle against those characteristics in Block S130, according to the geography-dependent model, data for evaluation can be acquired from one or more of: proximity sensors (e.g., to determine proximity of the autonomous vehicle to other objects), optical sensors with machine vision systems to assess pedestrian behaviors (e.g., perceived eye contact with the "driver" of the vehicle) or behaviors of other vehicles/ modes of transportation; optical sensors with machine vision systems to assess nearby object/entity types (e.g., adjacent scooters, adjacent bicycles, adjacent trucks, adjacent pedestrians, etc.); sensors to detect maneuvers of nearby vehicles/ objects/entities; force sensors (e.g., to detect any near-collision/collision events); audio sensors (e.g., to detect sounds indicative of interactions between the autonomous vehicle and other entities/objects, to detect vehicle horn usage, etc.); motion/position sensors (e.g., to detect characteristics of vehicle maneuvers and/or collision-related events); wearable computing devices; biometric monitoring devices (e.g., to detect physiological states of individuals involved in a traffic situation, to detect cognitive states of individuals involved in a traffic situation, etc.); and/or any other suitable sensors/sensor systems.

In variations, metrics for evaluation can be derived from or associated with one or more of: proximity metrics (e.g., proximity of the autonomous vehicle to other objects/entities during a maneuver, proximity of the autonomous vehicle to other objects/entities while not maneuvering, etc.) and evaluation of values of proximity metrics within ranges acceptable for the driving behaviors geographic location; PVA-derived metrics associated with driving aggression (e.g., abruptness in changes in position, velocity, or acceleration of the vehicle); lane position-derived metrics (e.g., number of times lanes are crossed while driving straight ahead, distance to lane boundaries, etc.); number/frequency of collision incidents per unit distance or time; number/ frequency of near-collision incidents per unit distance or time; metrics indicative of interruption of "normal" traffic flow for the geographic region (e.g., number of times other vehicles or entities behaved abnormally for the geographic region due to a behavior of the autonomous vehicle); and any other suitable metrics.

In one specific example, optical sensor systems can be used to identify that a pedestrian has attempted to make eye contact with the vehicle's driver (e.g., using eye tracking modules), and depending upon the location of the vehicle, the appropriateness of the maneuver performed by the vehicle after the eye contact attempt can be assessed (e.g., PVA metric values associated with vehicle movement and indicative of vehicle right-of-way, PVA metric values associated with vehicle stopping and indicative of pedestrian right-of-way, etc.). In another specific example, Block S130 can include determining an average proximity between the autonomous vehicle and surrounding vehicles during lane changes, in relation to geographic regions where cutting off other vehicles is acceptable/unacceptable. However, other examples of evaluation against metrics can be conducted in any other suitable manner.

Block S130 can additionally or alternatively include generating a traffic behavior-vehicle fit parameter for the autonomous vehicle according to the geography-dependent model, which provides a method for quantifying how appropriate vehicle physical features, vehicle aesthetic features, and/or driving behaviors are for cultural norms associated with a particular geographical region. Such fit parameters can account for one or more of: color of the vehicle (e.g., in relation to color symbolism in some cultures); interior styling of the vehicle (e.g., in relation to perceptions of quality); exterior styling of the vehicle (e.g., in relation to perceptions of luxury, in relation to perceptions of modernness, etc.); size of the vehicle; maximum/minimum seating capacity of the vehicle; safety features of the vehicle; interior environmental control aspects of the vehicle (e.g., AC in hotter climates, heating in colder climates, etc.), and any other suitable features affecting adoption in different geographical locations.

Evaluations of geography-dependent driving behavior can, however, include any other suitable parameters/metrics and be conducted in any other suitable manner.

3.4 Method—Sensor-Surrounding Analysis Using Sensor-Surrounding Model

Block S140 recites: determining a sensor-surrounding risk parameter upon evaluating sensor systems of the autonomous vehicle and environmental conditions surrounding the autonomous vehicle with a sensor-surrounding model, which functions to enable risk evaluations of the autonomous vehicle to incorporate sensor input/output deviations associated with different environmental conditions. As such, Block S140 can include collecting data and processing data with the comparative autonomous model to produce one or more outputs (e.g., parameter values) that can be further transformed into the risk analysis in downstream portions of the method 100. Block S140 can include identifying characteristics of the road/environment associated with the autonomous vehicle, and generating values of parameters indicative of proper sensor function in relation to the road/environment characteristics.

In relation to Block S140, the method 100 can include or otherwise be associated with Block S40, which recites: generating a sensor-surrounding model S40 characterizing surroundings of the autonomous vehicle. In variations, generating and/or implementing the sensor-surrounding model can include collecting data from one or more of: optical sensors (e.g., camera modules, infrared sensors, etc.), radar modules, LiDAR modules, PVA sensing systems (e.g., to detect road-induced motions of the vehicle), pressure sensors, moisture sensors, light sensors, temperature sensors, any other suitable sensors, location identifying systems (e.g., GPS) in combination with GPS-based weather services, vehicle subsystem states (e.g., windshield wiper states, AC/heater states, lighting system states, cruise control system states, gear shifting states, overdrive states, etc.), and any other suitable component that can be used to detect road and/or weather conditions that would affect or require sensor performance. Similar to other blocks of the method 100, generation of the sensor-surrounding model can include implementing machine learning and/or other described approaches for model generation. In variations, model generation can thus include extracting data, developing an architectural structure of the model, and training the model with training data to improve the model. In specific examples, Blocks S40 and S140 can include processing data components from multiple sources to extract and determine a road condition characterization (e.g., winding roads, rough roads, newly-placed asphalt, etc.) and/or weather conditions (e.g., rain, fog, high temperatures, etc.) and evaluate sensor system presence or function in relation to such conditions.

In relation to evaluation of acquired data using the sensor-surrounding model, Block S140 can include evaluating exposure to road/weather conditions or likelihood of exposure to road/weather conditions, and determining if the appropriate systems (e.g., sensor systems, systems that promote visualization/observation of the vehicle by other parties, etc.) for handling such conditions are present. Additionally, Block S140 can include determining if available systems for handling such conditions would be adversely affected in performance under such conditions. In variations, Block S140 can thus produce a sensor system-appropriateness metric for external conditions that characterizes exposure risk (e.g., in relation to time or distance) quantitatively or qualitatively (e.g., low risk to high risk), upon extracting sensor data, using the sensor data as inputs for the sensor-surrounding model, and generating outputs. The sensor system-appropriateness metric can account for, based upon road/weather conditions, the appropriate subsystems available, and the level to which each subsystem is compromised by conditions. In a specific example involving foggy driving conditions, the parameter can be determined by evaluating the systems available with the vehicle (e.g., fog sensors, moisture sensors, temperature sensors, GPS systems, beacons, lighting systems, infrared cameras, etc.) and evaluating system function in relation to severity of the foggy conditions. Alternatively, the sensor system-appropriateness metric can be defined in any other suitable manner.

3.5 Method—Security Analysis Using Sensor-Surrounding Model

Block S150 recites: determining a security risk parameter for the autonomous vehicle with a security risk model, which functions to enable risk evaluations of the autonomous vehicle to incorporate features associated with external and/or internal security threats. Block S150 can include collecting data and processing data with the security model to produce one or more outputs (e.g., parameter values) that can be further transformed into the risk analysis in downstream portions of the method 100. Block S150 is preferably implemented using a security diagnostic system associated with the vehicle, but can additionally or alternatively be implemented using any other system components operable to diagnose and/or detect security threats.

In relation to Block S150, the method 100 can include or otherwise be associated with Block S50, which recites: generating a security risk model characterizing security risks of the autonomous vehicle. Blocks S50 and S150 can thus include generating and implementing models that determine if the systems associated with the autonomous vehicle are unconnected or connected to a network that can be compromised (e.g., fleet-wide system modification networks of Tesla Motors™, Apple™ networks associated with vehicles, OBD module networks, etc.). Blocks S50 and S150 can additionally include determining the threat level associated with the network connections, and/or the threat-defense measures of the autonomous vehicle connected to the network(s). Similar to other blocks of the method 100, generation of the security risk model can include implementing machine learning and/or other described approaches for model generation. In variations, model generation can thus include extracting data, developing an architectural structure of the model, and training the model with training data to improve the model.

In variations of systems connected to networks, Blocks S50 and/or S150 can include generating and implementing models for evaluating network weakness (e.g., level of ability to be hacked using Qadium™ technologies or other network evaluation technologies), severity of vehicle compromise if the network is compromised (e.g., loss of vehicle subsystem control, loss of personal information, etc.), and threat defense measures of the vehicle and parameters associated with updates (e.g., frequency of updates, update status, test of updates by reliable parties, etc.). In variations of systems unconnected to networks, Block S150 can include evaluating the level of fortification of computing elements/hardware system elements of the vehicle. Block S150 can thus implement models of S50 to identify if the appropriate fortification systems are present and the robustness of available fortification systems to attack. In specific examples, Block S150 can evaluate the level of fortification of the vehicle's computing systems against undesired connection by electromagnetic induction, undesired connection by wire exposure, undesired connection by vehicle access by a threatening party, and any other suitable threat to the vehicle's computing system(s). However, Block S150 can be conducted in any other suitable manner.

While several categories of risk model data components are described above, Blocks S110-S150 can additionally or alternatively include receiving and/or extracting other data types/components for evaluating or modeling autonomous vehicle risk.

3.6 Method—Risk Model Data Combination/Processing

Block S160 recites transforming outputs of the comparative autonomous model, the mix model, the geography-dependent model, the sensor-surrounding model, and the security risk model, with an exposure parameter, into a risk analysis. Block S160 functions to process data retrieved in one or more of Blocks S110-S150 of the method 100 (e.g., in a series of assessments, in parallel, etc.) in order to produce a risk analysis based on outcomes (e.g., actual autonomous vehicle responses to different risk factors, simulated autonomous vehicle responses to different risk factors, etc.) of operation of the autonomous vehicle in relation to different factors. In particular, the exposure parameter can take into account driving load of the autonomous vehicle, and in a specific example, characterizes the expected distance (e.g., miles, kilometers, etc.) driven per unit time (e.g., per day, per week, per month, per year) of the autonomous vehicle.

Block S160 can include testing the ability of the autonomous vehicle to handle situations associated with each of Blocks S110-S150 (and other factors/situation) serially or in parallel, in order to generate the risk analysis. The risk analysis can include a risk score which, in some variations, aggregates or combines scores/ranking/evaluations of the autonomous vehicle in multiple risk categories. The risk score can include a weighted combination of scores in separate categories in order to holistically/globally describe the overall risk of the autonomous vehicle. Additionally or alternatively, the risk analysis can distinguish between different risk categories within which the autonomous vehicle was evaluated, and report level of ability of the autonomous vehicle to handle risks in each category.

In aggregating data in different risk categories/conditions, the risk model and any outputs thereof (some of which are described in Block S170 below) can be improved with collection of training data (i.e., from the autonomous vehicle in different geographical environments, from a fleet of autonomous vehicles in different geographical environments, etc.) and implementation of appropriate machine learning techniques in order to improve data collection associated with identifying conditions experienced by the vehicle, identifying which data features are most relevant in evaluating the vehicles, performing the vehicle evaluation in different risk categories, and/or improving vehicle response in different conditions, such that the vehicle response approaches or exceeds that of the best human drivers.

As such, in some variations, the method 100 can optionally include Blocks S60 and S65, which recite: in response to an identified driving mission of the autonomous vehicle, generating values of: a comparative autonomous parameter, a mix model parameter, a surrounding risk parameter, a geographic operation parameter, and a security risk parameter upon evaluating situational inputs associated with the identified driving mission with the comparative autonomous model, the mix model, the sensor-surrounding model, the geography-dependent model, and the security risk model S60; and upon generating values, generating a risk analysis upon processing values of the comparative autonomous parameter, the mix model parameter, the surrounding risk parameter, the geographic operation parameter, and the security risk parameter with a rule-based algorithm S65. Identification of the driving mission can be based upon passenger input, remote operator input, on-board operator input, GPS-enabled detection, and/or any other suitable manner.

In variations, the comparative autonomous parameter can be associated with one or more of: safety (e.g., a safety-characterizing metric that describes the outcome of maneuver for a human operator vs. a non-human operator), vehicle system load (e.g., a metric characterizing the amount of load on vehicle systems and/or occupants of the vehicle), proper selection of an implemented maneuver from various alternative maneuvers, and any other suitable metric for evaluating performance of a high intensity maneuver. Additionally or alternatively, in relation to vehicle system load, the comparative autonomous parameter can be associated with one or more of: stress on vehicle subsystems (e.g., forces incurred by different vehicle mechanical subsystems, electrical load incurred by different vehicle electronic subsystems, processing load incurred by different vehicle computing subsystems) due to the driving maneuver for both the autonomous vehicle and for the "average human" benchmark. Additionally or alternatively, in relation to maneuver selection, the comparative autonomous parameter can be associated with one or more of: appropriateness of different maneuver options that could have been used to respond to the triggering event, for both the autonomous vehicle and for the "average human" benchmark. In an example of a road obstruction, the parameter can be derived from an evaluation of maneuvers (e.g., swerving, running through the obstacle, braking abruptly, etc.), and thus include a rank or value of maneuver appropriateness for the selected maneuver. However, the comparative autonomous metric can be derived from or otherwise characterize any other suitable aspect of the comparative autonomous model in any other suitable manner.

In variations, the mix model parameter can characterize one or more of: mixed-traffic incident occurrence (e.g., number of positive incidents, number of negative incidents, severity of negative incidents, appropriateness of positive incidents, etc.) in relation to a time variable (e.g., per hour of driving, per day of driving, per month of driving, per year of driving), in relation to a distance variable (e.g., per mile driven, per 10 miles driven, per 100 miles driven, etc.), in relation to a frequency variable (e.g., average amount of time between positive incidents, average amount of time between negative incidents, etc.), and/or in relation to any other suitable variable.

In variations, the surrounding risk parameter can be associated with a sensor system-appropriateness metric for external conditions that characterizes exposure risk (e.g., in relation to time or distance) quantitatively or qualitatively (e.g., low risk to high risk), The sensor system-appropriateness metric can describe the appropriateness of vehicle subsystems available, and/or the level to which each subsystem is compromised by conditions. The surrounding risk parameter can characterize one or more of: road conditions (e.g., with a value describing road suitability for driving in terms of quality, in terms of icing, in terms of slickness, in terms of obstructions, etc.) and weather conditions (e.g., with a value describing weather suitability for driving in terms of visibility, in terms of moisture, in terms of wind, in terms of dust, etc.). In a specific example, the surrounding-risk parameter can provide a value of how appropriate the vehicle systems are for the environmental conditions of the driving mission (e.g., "the specifications of the vehicle are 72% appropriate in the current stormy conditions along the intended route"); However, the surrounding risk parameter can be derived from or otherwise characterize any other suitable aspect of the sensor-surrounding model in any other suitable manner.

In variations, the geographic operation parameter can characterize or be derived from proximity metrics (e.g., proximity of the autonomous vehicle to other objects/entities during a maneuver, proximity of the autonomous vehicle to other objects/entities while not maneuvering, etc.) and evaluation of values of proximity metrics within ranges acceptable for the driving behaviors geographic location; PVA-derived metrics associated with driving aggression (e.g., abruptness in changes in position, velocity, or acceleration of the vehicle); lane position-derived metrics (e.g., number of times lanes are crossed while driving straight ahead, distance to lane boundaries, etc.); number/frequency of collision incidents per unit distance or time; number/frequency of near-collision incidents per unit distance or time; metrics indicative of interruption of "normal" traffic flow for the geographic region (e.g., number of times other vehicles or entities behaved abnormally for the geographic region due to a behavior of the autonomous vehicle); and any other suitable metrics. However, the geographic operation parameter can be derived from or otherwise characterize any other suitable aspect of the geography-dependent model in any other suitable manner.

In variations, the security risk parameter can describe the level of fortification of the vehicle's computing systems against undesired connection by electromagnetic induction, undesired connection by wire exposure, undesired connection by vehicle access by a threatening party, and any other suitable threat to the vehicle's computing system(s). In a specific example, the surrounding-risk parameter can provide a value of how easily compromised the vehicle is in relation to security threats (e.g., "the systems of the vehicle are robust against 99% of potential security threats"); However, the security risk parameter can be derived from or otherwise characterize any other suitable aspect of the security threat model in any other suitable manner.

In variations or examples, similar to that described in relation to Blocks S110-S150 above, algorithms for generating the risk analysis with rule-based algorithms can employ approaches including any one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the method 100 can additionally or alternatively leverage: a probabilistic module, heuristic module, deterministic module, or any other suitable module leveraging any other suitable computation method, machine learning method or combination thereof.

3.7 Method—Risk Model-Derived Outputs/Responses

Block S170 recites: implementing a response action associated with the autonomous vehicle based upon the risk analysis, which functions to improve autonomous vehicle responses (e.g., immediately, at a later time point) upon analyzing different risk factors and/or responses of the autonomous vehicle to different risk factors. In relation to identified vehicle missions, the method 100 can additionally or alternatively analogously include Block S70, which recites: contemporaneously with execution of the identified driving mission, implementing a response action associated with control of the autonomous vehicle, based upon the risk analysis. In particular, the response action can improve vehicle evaluation at a subsequent time point or for another vehicle. Additionally or alternatively, the response action can be configured to improve vehicle performance (e.g., immediately, at a later time point) for the specific autonomous vehicle being evaluated and/or for other autonomous vehicles.

In some variations, the response action can include providing the risk analysis and risk score to an entity that can modify system configuration or operation of the autonomous vehicle, in order to improve performance of the autonomous vehicle at a future time point. As such, Block S170 and/or Block S70 can include generating an alert that is provided to an entity, wherein the alert notifies the entity regarding a status of the autonomous vehicle.

Additionally or alternatively, in some variations, the risk analysis can be used to identify gaps in evaluation of the autonomous vehicle, in order to guide or implement additional evaluations that should be conducted in the future.

Additionally or alternatively, the outputs of the risk analysis can be used to perform vehicle-specific and/or fleet-wide modifications of hardware/software/firmware, in order to improve performance of the autonomous vehicle(s) in different risk environments. In one variation, Block S170 and/or Block S70 can include automatically updating or customizing software/firmware of computing elements or vehicle subsystems in order to improve the ability of the autonomous vehicles to response to a specific situation encountered by the autonomous vehicle. In a specific example of this variation, the autonomous vehicle's system configurations can be updated automatically to appropriately slow down and drive around pedestrians in the middle of the road who have made eye contact, in the United States.

Additionally or alternatively, in some variations, the response action can include a transition into a state that allows a human driver to override the autonomous vehicle's operation. The transition into the overridden state can be triggered based upon an analysis that the autonomous vehicle is in unknown territory, experiencing conditions with an above-threshold tolerance of unknowns, in a compromised state due to a security threat, and/or by any other suitable rationale. The transition into the overridden state can be manually performed (e.g., a human driver receives an alert and then provides an input that indicates that he/she is taking control of driving). Alternatively, the transition into the overridden state can be automatic, such that the autonomous vehicle stops driving itself (e.g., pulls over when safe and slows to a stop) and the human operator must intervene. However, transitioning into an overridden state can alternatively be conducted in any other suitable manner. Furthermore, data that characterizes human handling of the vehicle and collected in the overridden state can be used as training data to improve future autonomous vehicle operation within the conditions associated with the override.

Additionally or alternatively, outputs of the risk analysis can be used to generate, in real time or near-real time, control instructions for the vehicle, in order to allow the vehicle to automatically respond to present risks, or to decrease vehicle operation risk by modifying vehicle operation aspects. Additionally or alternatively, in another variation, outputs of the risk analysis of Block S160 can be used to guide vehicle sensor/subsystem design, in order to improve future performance of such autonomous vehicles. However, any other suitable response action can be implemented in Block S170.

The system and methods of the preferred embodiment and variations thereof can be embodied and/or implemented at least in part as a machine configured to receive a computer-readable medium storing computer-readable instructions. The instructions are preferably executed by computer-executable components preferably integrated with multiple mobile electronic devices. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

The FIGURES illustrate the architecture, functionality and operation of possible implementations of systems, methods and computer program products according to preferred embodiments, example configurations, and variations thereof. In this regard, each block in the flowchart or block diagrams can represent a module, segment, step, or portion of code, which includes one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments include every combination and permutation of the various system components and the various method processes, including any variations, examples, and specific examples.

As a person skilled in the art will recognize from the previous detailed description and from the figures and claims, modifications and changes can be made to the preferred embodiments of the invention without departing from the scope of this invention defined in the following claims.

We claim:

1. A method for adaptive risk modeling for a vehicle, the method comprising:
   extracting a set of data features from mobile device sensor data, wherein the least one data feature of the set is associated with the vehicle, wherein at least one data feature of the set is associated with an environment of the vehicle;
   determining a set of outputs with a set of one or more machine learning models by evaluating the set of extracted data features using the set of machine learning models comprising at least:
   a first risk model configured to output a behavioral risk parameter value;
   a second geography-dependent model, determined based on aggregated characteristics of driving-related behaviors characterized as acceptable and associated with a specific location, configured to output a geography-dependent parameter value; and
   a third model associated with an environment of the vehicle which is configured to output surrounding-risk parameter value,
   transforming the set of outputs, with an exposure parameter, into a risk analysis; and implementing a response action associated with the vehicle based upon the risk analysis, and wherein the risk analysis enables fleet-wide modifications of vehicle hardware associated with a fleet of vehicles.

2. The method of claim 1, wherein implementing the response action comprises facilitating insurance processing based on the risk analysis.

3. The method of claim 1, wherein at least a portion of the set of features is determined based on an onboard computing system onboard the vehicle, wherein the onboard computing system comprises a set of sensors.

4. the method of claim 3, wherein the vehicle is a truck.

5. The method of claim 4, wherein the onboard computing system is a mobile device.

6. The medhod of claim 1, wherein the set of machine learning models evaluates:
   a behavioral risk parameter associated with operation of the vehicle;
   a traffic parameter associated with an environment of the vehicle;
   a geography-dependent parameter associated with the vehicle;
   a surrounding-risk parameter associated with an environment of the vehicle; and
   a security risk parameter associated with the vehicle.

7. The method of claim 1, wherein behavioral risk parameter value is determined based on an average driving behavior determined from an aggregated set of drivers.

8. The method of claim 1, wherein implementing the response action comprises providing the risk analysis to an entity that can perform vehicle-specific modifications of vehicle hardware based on the risk analysis.

9. The method of claim 8, wherein the vehicle is a truck.

10. The method of claim 9, wherein the risk analysis enables fleet-wide modifications of vehicle hardware associated with a fleet of trucks, wherein the fleet of trucks comprises the vehicle.

11. The method of claim 1, wherein the vehicle is operable by a human driver.

12. The method of claim 1, wherein the exposure parameter is determined based on a driving load of the vehicle.

13. The method of claim 12, wherein the load is at least one of an expected distance driven per unit time of the vehicle and a mechanical load of the vehicle.

* * * * *

UNITED STATES PATENT AND TRADEMARK OFFICE
CERTIFICATE OF CORRECTION

PATENT NO. : 11,878,720 B2
APPLICATION NO. : 16/861723
DATED : January 23, 2024
INVENTOR(S) : Jonathan Matus and Pankaj Risbood Page 1 of 1

It is certified that error appears in the above-identified patent and that said Letters Patent is hereby corrected as shown below:

In the Claims

Column 20, Line 48, In Claim 1, delete "the least" and insert --at least-- therefor Column 20, Line 64, In Claim 1, after "output", insert --a--

Column 21, Line 12, In Claim 4, delete "the method" and insert --The method-- therefor Column 21, Line 15, In Claim 6, delete "medhod" and insert --method-- therefor Signed and Sealed this
Fifth Day of March, 2024

Katherine Kelly Vidal
*Director of the United States Patent and Trademark Office*